(12) United States Patent
Takahashi (10) Patent No.: US 10,304,590 B2
(45) Date of Patent: May 28, 2019

(54) CABLE WATERPROOF STRUCTURE, WIRE HARNESS, AND METHOD OF MANUFACTURING WIRE HARNESS

(71) Applicant: Hitachi Metals, Ltd., Tokyo (JP)

(72) Inventor: Noriyuki Takahashi, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/879,597

(22) Filed: Jan. 25, 2018

(65) Prior Publication Data

US 2018/0218807 A1 Aug. 2, 2018

(30) Foreign Application Priority Data

Jan. 31, 2017 (JP) ................. 2017-015117

(51) Int. Cl.
*H01B 13/012* (2006.01)
*H01R 4/72* (2006.01)
(Continued)

(52) U.S. Cl.
CPC ....... *H01B 7/2825* (2013.01); *B60R 16/0207* (2013.01); *B60R 16/0215* (2013.01);
(Continued)

(58) Field of Classification Search
CPC .... H01R 4/72; H01R 43/005; H01R 13/5205; H01R 13/5216; H01R 2201/26; H02G 15/1806; H02G 3/0468; H02G 3/0481
USPC ....................................................... 174/74 R
See application file for complete search history.

(56) References Cited

U.S. PATENT DOCUMENTS

| 4,035,534 A | * | 7/1977 | Nyberg | B29C 61/065 |
| | | | | 428/34.9 |
| 4,288,107 A | * | 9/1981 | Schwartze | F16L 39/00 |
| | | | | 285/123.2 |

(Continued)

FOREIGN PATENT DOCUMENTS

| CN | 206893820 | * | 1/2018 |
| JP | 2015-073414 A | | 4/2015 |
| JP | 2015073414 | * | 4/2015 |

OTHER PUBLICATIONS

Heat Shrinkable Tubing Shrink-Kon Thomas&Betts.*

*Primary Examiner* — Andargie M Aychillhum
*Assistant Examiner* — Michael F McAllister
(74) *Attorney, Agent, or Firm* — Roberts Mlotkowski Safran Cole & Calderon, P.C.

(57) ABSTRACT

A cable waterproof structure includes a plurality of insulated wires and a sheath covering the plurality of insulated wires collectively, a heat shrinkable tube with adhesive that includes adhesive inside, and is provided and shrunk so as to cover an end of the sheath and a circumference of the plurality of insulated wires extended from the end of the sheath, and a fixing heat shrinkable tube that includes no adhesive inside, and is provided and shrunk so as to cover a part of the heat shrinkable tube with adhesive that covers the sheath and a circumference of the sheath extended from the heat shrinkable tube with adhesive, wherein a shrinkage start temperature of the fixing heat shrinkable tube is higher than a shrinkage start temperature of the heat shrinkable tube with adhesive.

9 Claims, 9 Drawing Sheets

(51) Int. Cl.
*H01B 7/282* (2006.01)
*H01R 43/00* (2006.01)
*B60R 16/02* (2006.01)
*H01B 7/00* (2006.01)
*H02G 15/18* (2006.01)
*H01R 13/52* (2006.01)
*H02G 3/04* (2006.01)

(52) U.S. Cl.
CPC ......... *H01B 7/0045* (2013.01); *H01B 13/012* (2013.01); *H01R 4/72* (2013.01); *H01R 43/005* (2013.01); *H02G 15/1806* (2013.01); *H01R 13/5205* (2013.01); *H01R 13/5216* (2013.01); *H01R 2201/26* (2013.01); *H02G 3/0468* (2013.01); *H02G 3/0481* (2013.01)

(56) References Cited

U.S. PATENT DOCUMENTS

| | | | | |
|---|---|---|---|---|
| 4,298,415 A | * | 11/1981 | Nolf | B29C 61/0641 156/85 |
| 4,427,725 A | * | 1/1984 | Crofts | B29C 61/0616 156/86 |
| 4,450,871 A | * | 5/1984 | Sato | B29C 61/0616 138/137 |
| 4,626,067 A | * | 12/1986 | Watson | G02B 6/4472 385/86 |
| 4,650,703 A | * | 3/1987 | Kleinheins | B29C 61/0616 138/140 |
| 5,714,715 A | * | 2/1998 | Sundhararajan | H02G 15/046 174/20 |
| 6,562,021 B1 | * | 5/2003 | Derbin | A61B 18/14 604/523 |
| 7,635,813 B2 | * | 12/2009 | Taylor | H02G 15/24 174/74 R |
| 7,973,241 B2 | * | 7/2011 | Evoniuk | H02G 15/24 174/84 R |
| 2009/0065237 A1 | * | 3/2009 | Evoniuk | H02G 15/1833 174/22 R |
| 2010/0307822 A1 | * | 12/2010 | Schmidt | H01B 3/442 174/74 R |
| 2015/0175095 A1 | * | 6/2015 | Inao | B60R 16/0207 174/72 C |

* cited by examiner

CABLE WATERPROOF STRUCTURE, WIRE HARNESS, AND METHOD OF MANUFACTURING WIRE HARNESS

The present application is based on Japanese patent application No. 2017-015117 filed on Jan. 31, 2017, the entire contents of which are incorporated herein by reference.

BACKGROUND OF THE INVENTION

1. Field of the Invention

This invention relates to a cable waterproof structure, a wire harness using the cable waterproof structure, and a method of manufacturing the wire harness.

2. Description of the Related Art

An electric brake system is used for vehicle such as an automobile. An Electro-Mechanical Brake (EMB) device and an Electric Parking Brake (EPB) device are known as the electric brake system.

The EMB device is simply referred to as "electronic brake" or "electric brake". The EMB device is configured to generate brake force depending on driver intention by controlling rotation driving force of respective electric motors provided on each wheel of vehicle in accordance with a brake pedal manipulated valuable (leg-power or displace amount) of driver and by pressing a brake pad to a disc rotor of wheel by a piston driven by the electric motor.

The EPB device is configured to generate the brake force by driving the respective electric motors provided on each wheel of vehicle by operating a parking brake start switch after stopping vehicle by the driver and pressing the brake pad on the disc rotor of wheel by the piston driven by the electric motor.

A vehicle often comprises sensors on the wheel such as a wheel speed sensor (it is also referred to as an Anti-lock Brake System (ABS) sensor) detecting firming wheel speed, an air pressure sensor detecting air pressure in a wheel, and a temperature sensor.

A wheel side and a vehicle side are connected by using a compound cable housing signal lines such as a signal line for the sensor mounted on the wheel and a signal line for the EMB device to control, and a power line to supply power to the EMB device or the electric motor for the EPB device.

Since a wire harness using the compound cable has different destinations of a plurality of insulated wires (the signal line and the power line described above) included in the cable, it is necessary to separate the insulated wires in accordance with the destinations. Since water may enter into a sheath over the insulated wires at the separated part of the insulated wires, it is necessary to ensure waterproofness at the separated part.

For example, covering the entire separated part by resin mold is known as the waterproof structure ensuring the waterproofness at the separated part of the insulated wire. However, in such configuration, the waterproof structure cannot ensure the waterproofness since the resin mold fails to closely adhere to an insulator when the resin mold comprises urethane resin and the insulator of the insulated wire comprises polyurethane. Providing a heat shrinkable tube with adhesive additionally to cover the resin mold, and the insulated wire and the cable extended from the resin mold is also known. However, it takes many times in manufacturing since it is necessary to provide the heat shrinkable tube with adhesive with respect to extending destinations of the wires and the cables.

The inventors consider ensuring the waterproofness at the separated part by covering the sheath and the insulated wire extended from an end of sheath collectively with the heat shrinkable tube with adhesive.

When only the heat shrinkable tube with adhesive is provided, the adhesive melts and the resin tube shrinks again under high temperature environment, for example, at not less than 120° C. Thus, the inventors confirm that the resin tube may be slipped out of the sheath. Although the inventors consider fastening and fixing a part of the resin tube that covers the sheath tightly by using INSULOK (a registered trademark for a cable tie) the inventors confirm that the resin tube slips out under the high temperature environment even when using the INSULOK.

JP 2015/073414 A discloses the cable waterproof structure that covers the sheath and the insulated wire extended from the sheath collectively by using the heat shrinkable tube with adhesive, and provides a low temperature shrink type t shrinkable tube of which the shrinkage start temperature is lower than the shrinkage start temperature of the heat shrinkable tube with adhesive so as to cover the end of heat shrinkable tube with adhesive and the sheath collectively. The structure disclosed by JP 2015/073414 A can prevent the resin tube from slipping out under the high temperature environment.

SUMMARY OF THE INVENTION

Since the low temperature shrink type heat shrinkable tube provided outside shrinks before the heat shrinkable tube with adhesive provided inside shrinks, the heat shrinkable tube with adhesive provided inside may be pushed out and slipped out of the sheath by the shrink, or the heat shrinkable tube with adhesive wrinkles. Thus, the cable waterproof structure disclosed by JP 2015/073414 A may not ensure the waterproofness. It still has scope for improvement.

It is an object of the invention to provide a cable waterproof structure that more firmly ensures the waterproofness, as well as a wire harness using the cable waterproof structure and a method of manufacturing the wire harness.

According to an embodiment of the invention, a cable waterproof structure comprises:

a cable comprising a plurality of insulated wires and a sheath covering the plurality of insulated wires collectively;

a heat shrinkable tube with adhesive that comprises adhesive inside, and, and is provided and shrunk so as to cover an end of the sheath and a circumference of the plurality of insulated wires extended from the end of the sheath; and a fixing heat shrinkable tube that comprises no adhesive inside, and is provided and shrunk so as to cover a part of the heat shrinkable tube with adhesive that covers the sheath and a circumference of the sheath extended from the heat shrinkable tube with adhesive, wherein a shrinkage start temperature of the fixing heat shrinkable tube is higher than a shrinkage start temperature of the heat shrinkable tube with adhesive.

According to another embodiment of the invention, a wire harness comprises:

a cable comprising a plurality f insulated wires and a sheath covering the plurality of insulated wires collectively;

a heat shrinkable tube with adhesive that comprises adhesive inside, and is provided and shrunk so as to cover an end of the sheath and a circumference of the plurality of insulated wires extended from the end of the sheath; and a fixing heat shrinkable tube that comprises no adhesive inside, and is provided and shrunk so as to cover a part of the heat shrinkable tube with adhesive that covers the sheath and a circumference of the sheath extended from the heat shrinkable tube with adhesive, wherein a shrinkage start temperature of the fixing heat shrinkable tube is higher than a shrinkage start temperature of the heat shrinkable tube with adhesive.

According to the other embodiment of the invention, a method of manufacturing a wire harness comprising a cable comprising a plurality of insulated wires and a sheath covering the plurality of insulated wires collectively comprises:

a first waterproof processing that provides a heat shrinkable tube with adhesive that comprises adhesive inside to cover an end of the sheath and a circumference of the plurality of insulated wires extended from the end of the sheath, and heats and shrinks the heat shrinkable tube with adhesive; and a second waterproof processing that provides a fixing heat shrinkable tube that comprises no adhesive inside, of which shrinkage start temperature is higher than a heat shrinkage start temperature of the heat shrinkable tube with adhesive to cover a part of the heat shrinkable tube with adhesive that covers the sheath and the sheath extended from the heat shrinkable tube with adhesive, and heats and shrinks the fixing heat shrinkable tube.

Effects of the Invention

According to an embodiment of the invention, a cable waterproof structure can be provided that more firmly ensures the waterproofness, as well as a wire harness using the cable waterproof structure and a method of manufacturing the wire harness.

BRIEF DESCRIPTION OF THE DRAWINGS

Next, the present invention will be explained in conjunction with appended drawings, wherein.

DETAILED DESCRIPTION OF THE PREFERRED EMBODIMENTS (Embodiments)

The embodiment in the invention will be described below in conjunction with the appended drawings.

(Explanation of a Vehicle to Which a Wire Harness is Applied)

Figure 1:
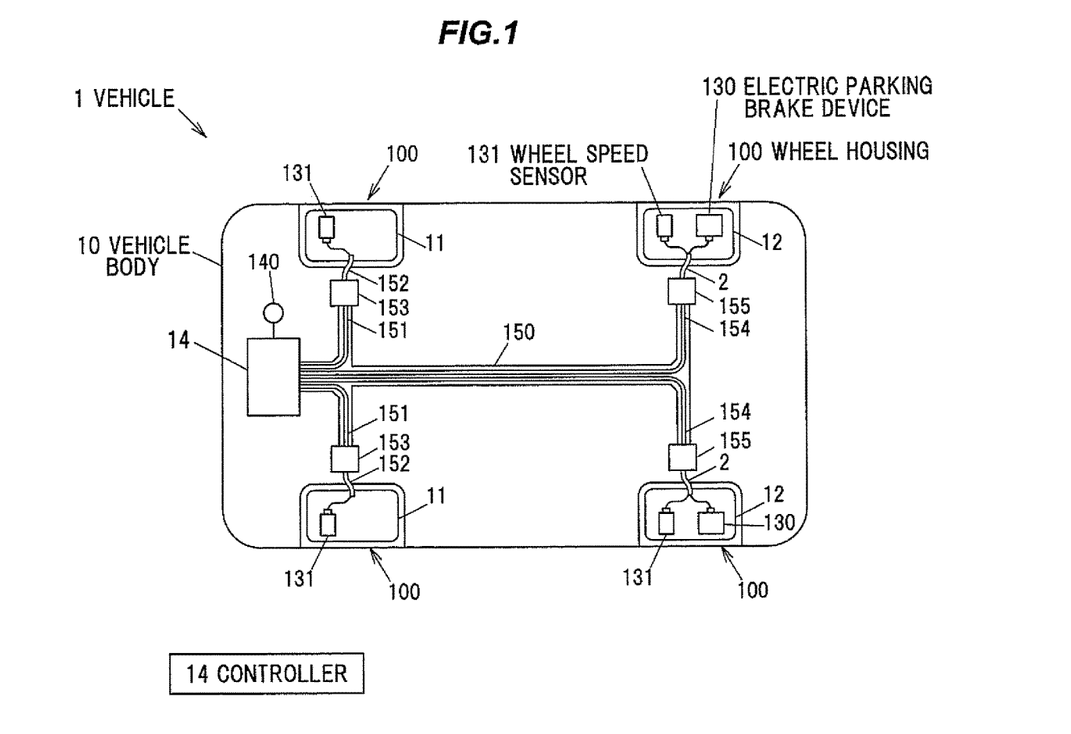
FIG. 1 is a schematic view showing a structure of vehicle to which a wire harness according to an embodiment of the invention is applied.

FIG. 1 is a schematic view showing a structure of vehicle to which a wire harness according to the embodiment is applied.

A vehicle 1 is provided with four wheel housings 100 in a vehicle body 10. Two front wheels 11 and two rear wheels 12 are arranged in the wheel housings 100 respectively. In the embodiment, the vehicle 1 is a front wheel drive vehicle. The vehicle 1 is driven by subjected to the driving force from a driving source (not shown) provided with an engine or an electrical motor. In other words, the front wheel 11 is a driving wheel and the rear wheel 12 is a driven wheel.

The vehicle 1 is provided with two EPB devices 130 and a controller 14. The EPB devices 130 are respectively provided on the two rear wheels 12. The EPB devices 130 generate brake force to the rear wheels 12. The controller 14 can detect operating condition of a parking brake operated switch 140 provided on the vehicle interior. Driver can switch operated state and non-operated state of the EPB device 130 by turning on/off the parking brake operated switch 140.

For example, when the driver turns the parking brake operated switch 140 on to off when parking, the controller 14 outputs operating current to operate the EPB device 130 in a predetermined time (for example, 1 second). The EPB device 130 is operated and generates the brake force to the rear wheel 12. The operated state of the EPB device 130 is kept until the controller 14 outputs current to turn the electric parking brake device 130 into the non-operated state. As described above, the EPB device 130 mainly generates the brake force after the vehicle 1 is stopped.

The controller 14 outputs current to turn the EPB device 130 into the non-operated state when the parking brake operated switch 140 is turned on into off by driver steering. The controller 14 outputs current to turn the EPB device 130 into the non-operated state, for example, when an accelerator pedal is stamped besides when the parking brake operated switch 14 is turned off.

Wheel speed sensors (ABS sensors) 131 to detect the wheel speed are provided on the front wheel 11 and the rear wheel 12. The wheel speed sensor 131 is a known sensor. The wheel speed sensor 131 is provided with a magnetic field detection element to detect magnetic field of a circular magnetic encoder that rotates with the front wheel 11 or the rear wheel 12. The wheel speed sensor 131 detects the wheel speed (the rotational speed of the front wheel 11 or the rear wheel 12) in accordance with a cycle to change magnetic field detection.

The controller 14 and the wheel speed sensor 131 in the from wheel 11 are electrically connected over an electric wire group for the front wheel 151 provided with a plurality of electric wires and a wire harness for the front wheel 152. The electric wire group for the front wheel 151 and the wire harness for the front wheel 152 are connected in a relay box 153 fixed on the vehicle body 10. The relay boxes 153 are provided near each matched pair of the front wheels 11 respectively.

The controller 14, and the EPB device 130 and the wheel speed sensor 131 in the rear wheel 12 are electrically connected over an electric wire group for the rear wheel 154 provided with a plurality of electric wires and a wire harness 2 according to the embodiment. The electric wire group for the rear wheel 154 and the wire harness 2 are connected in a relay box 155 fixed on the vehicle body 10. The relay boxes 155 are provided near each matched pair of the, rear wheels 12 respectively.

The electric wire group for the front wheel 151 is arranged in a raceway 150 provided on the vehicle body 10 while bundled. Also, as with the electric wire group for the front wheel 151, the electric wire group for the rear wheel 154 is arranged in the raceway 150 provided, on the vehicle body 10 while bundled.

One end of the wire harness for the front wheel 152 is connected with the wheel speed sensor 131 in the front wheel 11. The other end is housed in the relay box 153. One end of the wire harness for the rear wheel 2 is connected with the EPB device 130 and the wheel speed sensor 131 in the rear wheel 12. The other end is housed in the relay box 155. Since the wire harness for the front wheel 152 and the wire harness for the rear wheel 2 are bent depending on ups and downs of the front wheel 11 and the rear wheel 12 against the vehicle body 10 by running of the vehicle 1, the wire harness for the front wheel 152 and the wire harness for the rear wheel 2 are necessary to have high bending resistance.

(Explanation of the Cable used for the Wire Harness 2)

Figure 2:
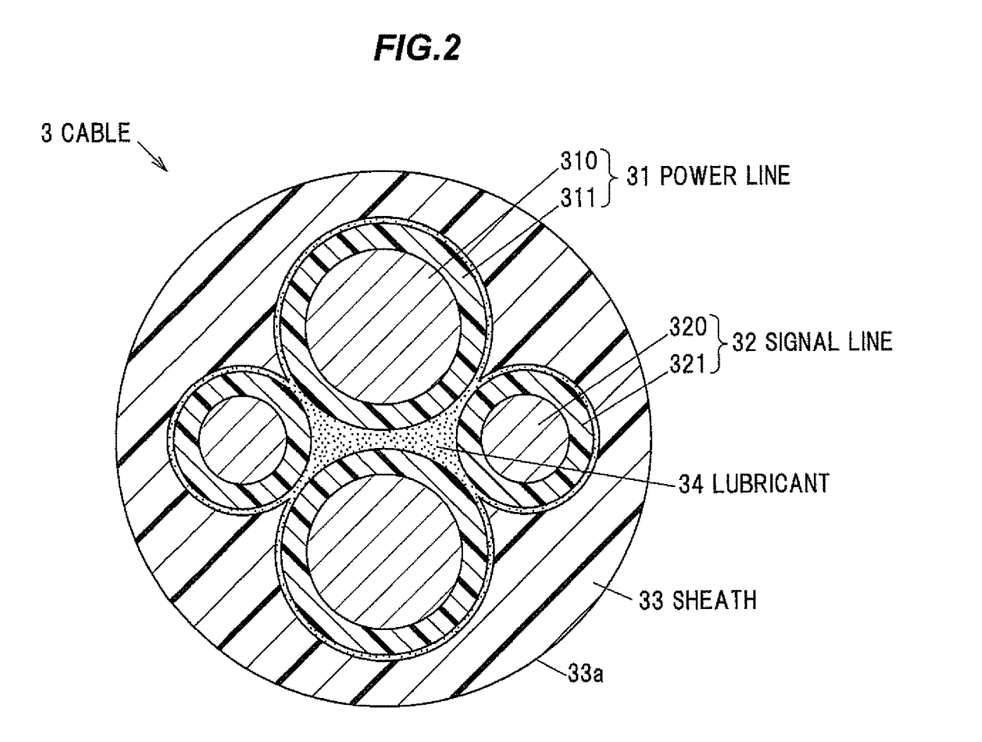
FIG. 2 is a cross sectional view showing a cable used for the wire harness.

FIG. 2 is a cross sectional view showing the cable 3 used for the wire harness 2. The cable 3 is provided with one pair of power lines 31, one pair of signal lines 32, a sheath 33 that covers the one pair of power lines 31 and the one pair of signal lines 32 collectively. In the embodiment, the one pair of power lines 31 and the one pair of signal lines 32 are held in the sheath 33 through a lubricant 34. The power lines 31 and the signal lines 32 are one embodiment of the insulated wire of the invention.

A first power source connector (not shown) to connect with the EPB device 130 is attached on one end of the one pair of power lines 31. A second power source connector (not shown) to connect with the electric wire group for the rear wheel 154 in the relay box 155 is attached on the other end of the one pair of power lines 31.

The wheel speed sensor 131 is attached on one end of the one pair of signal lines 32. A signal line connection connector (not shown) to connect with the electric wire group for the rear wheel 154 in the relay box 155 is attached on the other end of the one pair of signal lines 32.

The wire harness 2 according to the embodiment s provided with the cable 3, the first power source connector, the second power source connector, the wheel speed sensor 131, and the signal line connection connector. As the description will be described below, the one pair of power lines 31 and the one pair of signal lines 32 are separated in the wire harness 2. A cable waterproof structure 4 according to the embodiment is used to ensure waterproofness in the separated part 3a.

The one pair of power lines 31 are used to supply current to the EPB device 130. The one pair of signal lines 32 are used to transmit the detection signal of the wheel speed sensor 131 to the controller 4. That is, the one pair of signal lines 32 transmits the detection signal of vehicle state quantity indicating running state of the vehicle 1 to the controller 14 while the vehicle 1 runs.

The one pair of power lines 31 are insulated wires formed by covering central conductors 310 comprising high conductivity wire such as copper wire with an insulator 311 comprising insulating resin. The central conductor 310 is a stranded wire comprising a plurality of strands. For example, the insulator 311 comprises crosslinked polyethylene (PE) or flame retardant crosslinked polyethylene (PE).

The signal line 32 is an insulated wire formed by covering a central conductor 320 comprising high conductivity wire such as copper wire with an insulator 321 comprising insulating resin. The central conductor 320 is a stranded wire comprising a plurality of strands. For example, the insulator 321 comprises crosslinked polyethylene (PE) or flame retardant crosslinked polyethylene (PE). The outer diameter of signal line 32 is less than the outer diameter of power line 31.

The power line 31 and the signal line 32 are not covered with a shield conductor. That is, no conductive member that shields electromagnetic wave is arranged between the power line 31 and the signal line 32. It is due to focus on unnecessity of providing the shield conductor between the signal line 32 and power line 31 since the current mainly flows in the power line 32 when the vehicle 1 is stopped and the signal line 32 mainly transmits the electrical signal when the vehicle 1 runs. That is, when the current flows in the one pair of power lines 31, the electromagnetic wave caused by the current may affect a potential difference between the one pair of signal lines 32. Meanwhile, the controller 14 can exclude the electrical signal in the signal line 32 when the vehicle 1 whose vehicle speed is zero is stopped. Thus, the electromagnetic wave can be affected no adverse effect when the vehicle 1 runs. Meanwhile, not covering the signal line 32 with no shield conductor can increase flexibility and bendability of the cable 3, and can contribute to weight saving and cost saving of the cable 3.

The power line 31 and the signal line 32 are arranged alternately in a circumferential direction of the cable 3. The one pair of power lines 31 and the one pair of signal lines 32 are stranded.

The sheath 33 comprises insulating resin. In the embodiment, the sheath 33 comprises soft polyurethane having high flexibility and high resistance.

For example, particle diameter of the lubricant 34 is within 5 to 50 μm. Talc ($Mg_3Si_4O_{10}(OH)_9$) or Silica ($SiO_2$) etc., can be suitably used as the material of lubricant. The particle diameter means a size of the particle calculated by methods such as a screening method defined by JIS 8801, a microscopy method, a laser differential scattering method, an electrical detection method, and a chromatography method. Meanwhile, a paper tape or lubricant oil may be used as the lubricant 34. Using the lubricant 34 allows smoothing movement of the one pair of power lines 31 and the signal line 32 in the sheath 33, and increasing flexibility. It facilitates a terminal processing of the cable 3.

(Explanation of the Cable Waterproof Structure)

Figure 3A:
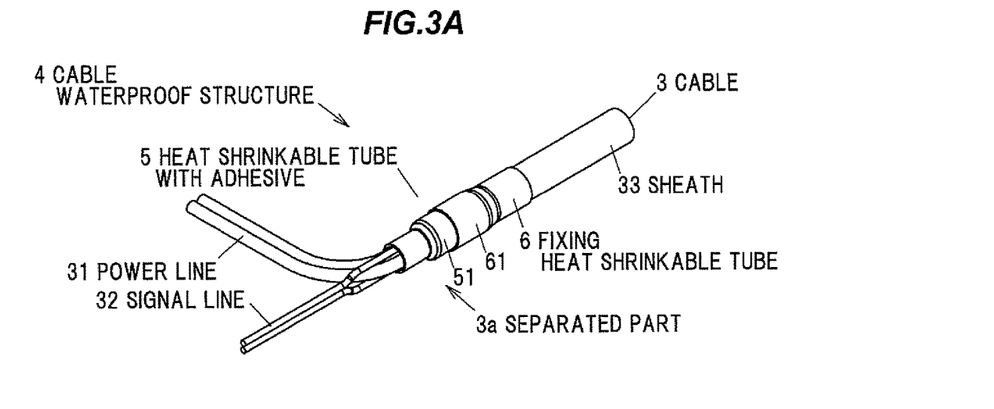
FIG. 3A is a perspective view showing a cable waterproof structure according to the embodiment of the invention.
Figure 3B:
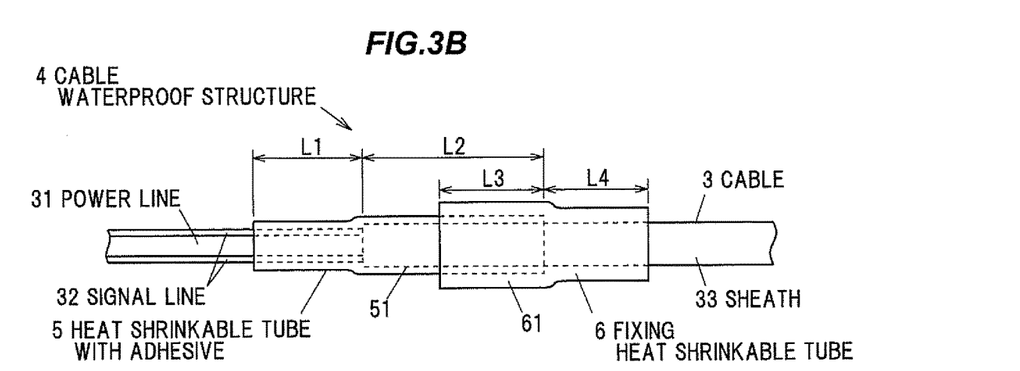
FIG. 3B is a side view showing the cable waterproof structure according to the embodiment of the invention.

FIG. 3A is a perspective view showing the cable waterproof structure according to the embodiment of the invention. FIG. 3B is a side view showing the cable waterproof structure according, to the embodiment of the invention.

As shown in FIGS. 3A, 3B, the cable waterproof structure 4 according to the embodiment ensures the waterproofness at the separated part 3a of the cable 3. A part of the sheath 33 is removed and the power line 31 and the signal line 32 are exposed at the separated part 3a of the cable 3. The cable waterproof structure 4 is provided from an end of the sheath 33 to the power line 31 and the signal line 32 extended from the sheath 33 to prevent water from entering into the sheath 33. The cable waterproof structure 4 is provided to seal an end face of the sheath 33.

The cable waterproof structure 4 is provided with a heat shrinkable tube with adhesive 5 and a fixing heat shrinkable tube 6.

The heat shrinkable tube with adhesive 5 has adhesive (not shown) inside. The heat shrinkable tube with adhesive 5 is arranged to cover the end of sheath 33 and the circumference of the plurality of insulated wires (the one pair of power lines 31 and the one pair of signal lines 32) extended from the end of sheath 33 collectively.

The heat shrinkable tube with adhesive 5 is provided with a resin tube 51 having heat shrinkable property, an adhesive layer (not shown) comprising adhesive provided on an inner peripheral surface of the resin tube 51. In the embodiment, the resin tube 51 comprising polyolefin is used. The adhesive providing the adhesive layer comprises hot melt adhesive such as epoxy resin.

The adhesive of the heat shrinkable tube with adhesive 5 is melted by heat when the resin tube is shrunk and enters into gaps between the resin tube 51, the power line 31, the signal line 32, and the sheath 33. The adhesive cures after the resin tube shrinks and seals the gaps between the resin tube 51, the power line 31, the signal line 32, and the sheath 33.

In the embodiment, the gaps between each core wire become larger than the gaps between each core wire of a cable such as a two-core cable since the four-core cable 3 provided with the one pair of power lines 31 and the one pair of signal lines 32 is used in the embodiment. Thus, in the embodiment, adhesive is added separately with the adhesive in the heat shrinkable tube with adhesive 5 to seal the gap between each core wire (the one pair of power lines 31 and the one pair of signal lines 32) surely.

Figure 7A:
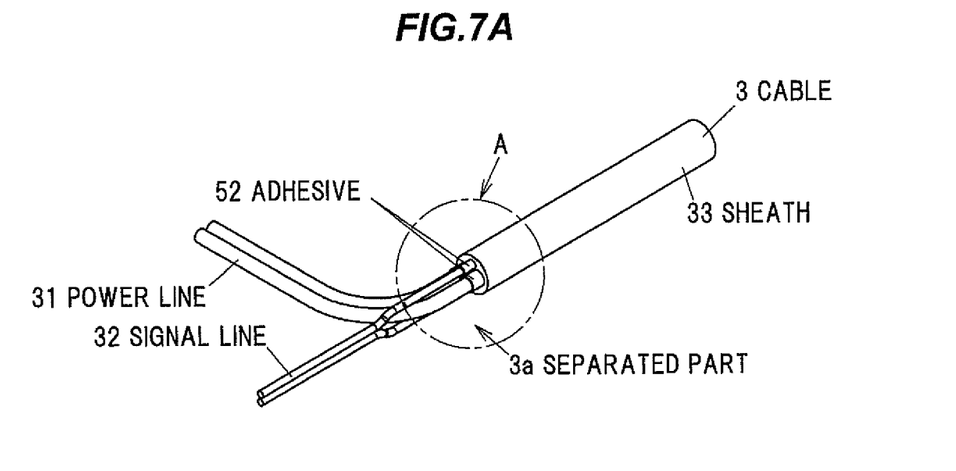
FIG. 7A is a perspective view showing the cable in FIG. 6 on which adhesive is provided.
Figure 7B:
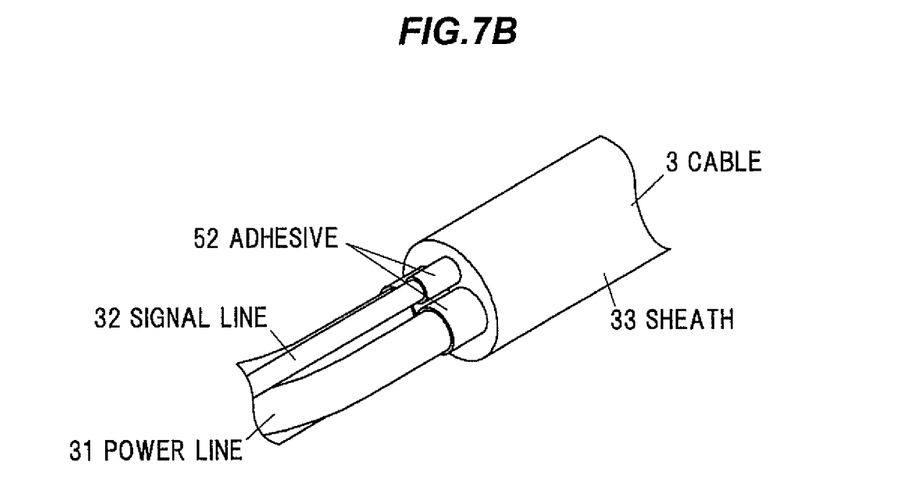
FIG. 7B is an enlarged view of part A in FIG. 6.

Specifically, the heat shrinkable tube with adhesive 5 is previously provided after providing a circular (short cylindrical) adhesive 52 on the circumference of the both power lines 31 and the both signal lines 32 (see e.g. FIGS. 7A, 7B). The gap between core wires is filled by shrinking the heat shrinkable tube with adhesive 5 by heating, and melting the cylindrical adhesive 52. It is preferable to use adhesive having same content with the adhesive of the heat shrinkable tube with adhesive 5 as the cylindrical adhesive 52. The hot melted adhesive such as epoxy resin can be used.

A length L2 of an overlap part between the heat shrinkable tube with adhesive 5 and the sheath 33 is desirably not less than 5 mm, and preferably not less than 10 mm. When the length L2 is less than 5 mm, the heat shrinkable tube with adhesive 5 may be likely to slip out of the sheath 33 in high temperature. In such configuration, the length L2 is set at 20 mm. It is preferable to set a length. L1 of a non-overlap part between the heat shrinkable tube with adhesive 5 and the sheath 33 (i.e., a cover part covering the circumference of the power line 31 and the signal line 32 extended from the sheath 33) such that enough waterproofness can be ensured by sealing by the adhesive, and is desirably not less than 5 mm and preferably not less than 10 mm. In such configuration, the length L1 is set at 10 mm.

The fixing heat shrinkable tube 6 is a member to prevent position gap in the heat shrinkable tube with adhesive 5 in high temperature. The fixing heat shrinkable tube 6 is provided with no adhesive (adhesive layer) inside. The fixing heat shrinkable tube 6 is provided with only the resin tube 61. The fixing heat shrinkable tube 6 is provided to cover a part of the heat shrinkable tube with adhesive 5 that covers the sheath 33, and a circumference of the sheath 33 extended from the heat shrinkable tube with adhesive 5. An inner peripheral surface of the resin tube 61 providing the fixing heat shrinkable tube 6 contacts directly with an outer peripheral surface of the resin tube 51 and an outer peripheral surface of the sheath 33.

Meanwhile, the heat shrinkable tube with adhesive cannot be used for the fixing heat shrinkable tube 6. If the heat shrinkable tube with adhesive is used for the fixing heat shrinkable tube 6, the adhesive melts and acts as lubricant. Moving the fixing heat shrinkable tube 6 along the cable longitudinal direction by shrinking the heat shrinkable tube with adhesive 5 fails to be prevented. Therefore, the heat shrinkable tube with adhesive 5 may be slipped out of the sheath 33.

Shrinkage start temperature of the fixing heat shrinkable tube 6 is higher than shrinkage start temperature of the heat shrinkable tube with adhesive 5 in the cable waterproof structure 4 according to the embodiment. As detail will be described below, an method of manufacturing the wire harness according to the embodiment shrinks an end of the resin tube 51 of the heat shrinkable tube with adhesive 5 at the same time with shrinking the fixing heat shrinkable tube 6. If the shrinkage start temperature of the fixing heat shrinkable tube 6 is lower than the shrinkage start temperature of the heat shrinkable tube with adhesive 5, the fixing heat shrinkable tube 6 shrinks faster than the heat shrinkable tube with adhesive 5. The position gap may be developed in the heat shrinkable tube with adhesive 5 or the heat shrinkable tube with adhesive 5 (the resin tube 51) may be wrinkled inside the fixing heat shrinkable tube 6 in the circumferential direction caused by pushing by shrinking fixing heat shrinkable tube 6. The position gap in the heat shrinkable tube with adhesive 5 causes decreasing the waterproofness caused by shortening the length L2 described above. The wrinkle of the heat shrinkable tube with adhesive 5 develops the gap between the sheath 33, the resin tube 61, and the resin tube 51, and causes decreasing the waterproofness.

The resin tube 51 of the heat shrinkable tube with adhesive 5 inside the fixing heat shrinkable tube 6 shrinks before shrinking the fixing heat shrinkable tube 6 and then the fixing heat shrinkable tube 6 shrinks when the shrinkage start temperature of the fixing heat shrinkable tube 6 is higher than the shrinkage start temperature of the heat shrinkable tube with adhesive 6 as with the embodiment. Developing the position gap of the heat shrinkable tube with adhesive 5 or the wrinkle in the heat shrinkable tube with adhesive 5 is prevented. Thus, the waterproofness can be increased. Meanwhile, the shrinkage start temperature means a temperature beginning to shrink the resin tubes 51, 61. The shrinkage start temperature is defined by the temperature at which the inner diameter of the resin tubes 51, 61 shrinks not less than 1% of the inner diameter before shrinking.

The fixing heat shrinkable tube 6 has stiffness higher than the heat shrinkable tube with adhesive 5. Thus, the heat shrinkable tube with adhesive 5 is clamped solidly and the position gap of the heat shrinkable tube with adhesive 5 in high temperature is prevented. The heat shrinkable tube with adhesive 5 prevents slipping out of the sheath 33. In the embodiment, a resin tube comprising hard polyolefin is used as the resin tube 61 of the fixing heat shrinkable tube 6.

The fixing heat shrinkable tube 6 comprising harder material than the sheath 33. "The fixing heat shrinkable tube 6 comprising harder material than the sheath 33" means that the fixing heat shrinkable tube 6 is more inflexible (has high stiffness) than the sheath 33 when the fixing heat shrinkable tube 6 is in same with the sheath 33 in shape (for example, a cylindrical shape whose inner diameter or outer diameter and length are in same).

Therefore, bending the cable 3 is prevented (i.e., hard to bent) at a position where the fixing heat shrinkable tube 6 is provided if the cable 3 is bent near the fixing heat shrinkable tube 6 in a cable layout. Bending the cable 3 at the position where the fixing heat shrinkable tube 6 is provided is subject to develop the gap between the fixing heat shrinkable tube 6 and the cable 3 at an outside of bending. It is unlikable in terms of the waterproofness. Meanwhile, the development of such gap is prevented and the waterproofness can increase moreover by hard to bending the cable 3 at the position where the fixing heat shrinkable tube 6 is provided.

The gap between the heat shrinkable tube with adhesive 5 and the fixing heat shrinkable tube 6 developed by bending is hard to be developed at the overlap between the heat shrinkable tube with adhesive S and the fixing heat shrinkable tube 6 since the both heat shrinkable tubes 5, 6 has high stiffness and are hard to be bent. Furthermore, since both ends of the heat shrinkable tube with adhesive 5 are respectively covered with the fixing heat shrinkable tube 6 and a separated part housing 21 (that will be described below), there is no problem in the waterproofness if the heat shrinkable tube with adhesive 5 is bent at the part where only the heat shrinkable tube with adhesive 5 is provided. The stiffness of the heat shrinkable tube with adhesive 5 may be relatively small.

The fixing heat shrinkable tube 6 prevents the position gap developed by shrinking the heat shrinkable tube with adhesive 5 in high temperature by frictional force between the resin tubes 51, 61 and frictional force between the resin tube 61 and the sheath 33. Therefore, length (area) overlapping the both resin tubes 51, 61 and length (area) contacting the resin tube 61 with the sheath 33 are necessary to be the length (area) that frictional force approximately preventing developing the position gap of the heat shrinkable tube with adhesive 5 can be obtained.

In detail, the overlap length L3 between the heat shrinkable tube with adhesive 5 and the fixing heat shrinkable tube 6 along the cable longitudinal direction is desirable to be not less than 1 mm and not more than 12 mm, preferably to be not less than 5 mm and not more than 12 mm. As the overlap length L3 is less than 1 mm, the frictional force between the resin tubes 51, 61 deceases. The heat shrinkable tube with adhesive 5 may be slipped out of the fixing heat shrinkable tube 6 in high temperature. Thus, the heat shrinkable tube with adhesive 5 may be slipped out of the sheath 33. Meanwhile, as the overlap length L3 is more than 12 mm. The overlap between the both heat shrinkable tubes 5, 6 that is hard to be bent is long and freedom of the cable layout may be decreased. In the embodiment, the overlap length L3 is set at 10 mm.

Furthermore, the overlap length L3 is desirably shorter than the length L2 of the overlap between the heat shrinkable tube with adhesive 5 and the sheath 33. As the overlap length L3 is not less than the length L2 and the fixing heat shrinkable tube 6 is protruded from the sheath 33, the power line 31 and the signal line 32 that have shorter diameter than the fixing heat shrinkable tube 6 moves for an extending side by shrinking the shrinkable tube for fixing 6 in high temperature. Therefore, the power line 31 and the signal line 32 may be slipped out along with the heat shrinkable tube with adhesive 5 of the sheath 33.

The length L4 along the cable longitudinal direction of the non-overlap part between the fixing heat shrinkable tube 6 and the heat shrinkable tube with adhesive 5 is desirably not less than 1 mm and not more than 12 mm, preferably not less than 5 mm and not more than 12 mm. As the length L4 is less than 1 mm, the friction force between the resin tube 51 and the sheath 33 decreases and the fixing heat shrinkable tube 6 moves along the cable longitudinal direction with the heat shrinkable tube with adhesive 5 in high temperature. Thus, the position gap of the heat shrinkable tube with adhesive 5 may not be prevented. Meanwhile, the length L4 is more than 12 mm, entire size of the cable waterproof structure 4 becomes large and the freedom of the cable layout decreases. In the embodiment the length L4 is set at 10 mm.

(Explanation of the Separated Part 3a of the Cable 3 in the Wire Harness 2)

Figure 4A:
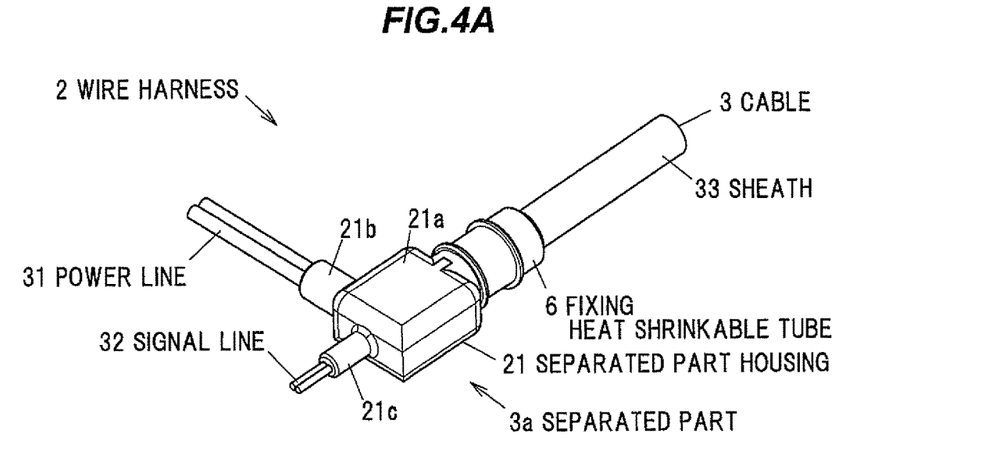
FIG. 4A is a perspective view showing a separated part of the cable in the wire harness.
Figure 4B:
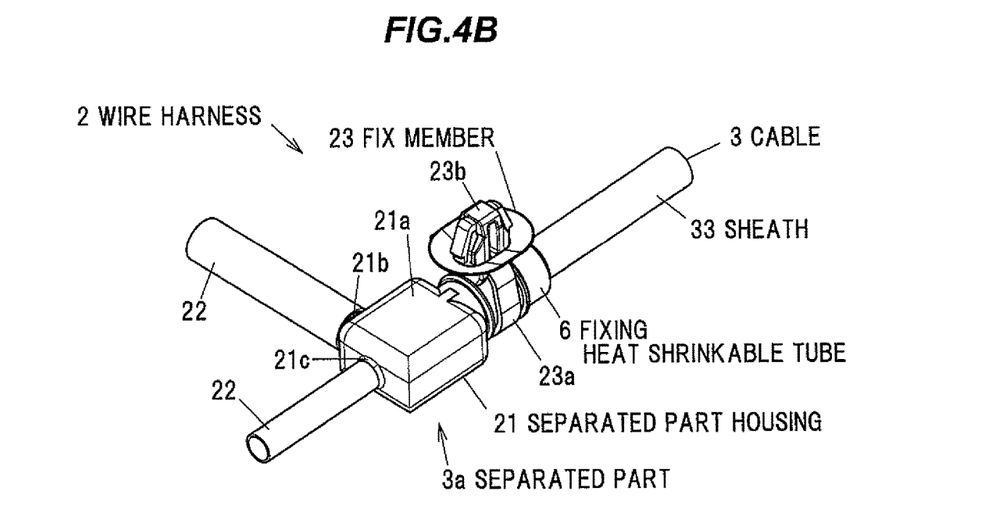
FIG. 4B is a perspective view showing a separated part housing on which a convoluted tube and a fixing member are provided.

FIG. 4A is a perspective view showing the separated part 3a of the cable 3 in the wire harness 2. FIG. 4B is a perspective view showing the separated part housing on which a convoluted tube and a fixing member are provided.

As shown in FIGS. 4A, 4B, the wire harness 2 is separated into the power line 31 and the signal line 32 at the heat shrinkable tube with adhesive 5 at an opposite side to the fixing heat shrinkable tube 6. The separated part housing 21 is provided to cover the separated part 3a and a part of the heat shrinkable tube with adhesive 5 (an opposite end of the fixing heat shrinkable tube 6).

The separated part housing 21 is a member combining functions to hold the power line 31 and the signal line 32 while keeping, extending directions of the power line 31 and the signal line 32, to protect from chipping etc., to fix an end of convoluted tube 22, and to be as a base attaching a fix member 23.

In the embodiment, the separated part housing 21 comprises resin mold and is formed by resin molding using a mold. It is preferable to use soft polyurethane having high flexibility and high durability for resin used for the separated part housing 21.

In the embodiment, the separated part housing 21 fails to cover the fixing heat shrinkable tube 6. It is because that the position gap of the heat shrinkable tube with adhesive 5 (i.e., decreasing the above length L2, or slipped out of the sheath 33) may be developed when the separated part housing 21 is molded to cover the fixing heat shrinkable tube 6. As the detail will be described below, in the embodiment, the separated part housing 21 is formed by pouring resin into the mold while the end of fixing heat shrinkable tube 6 (the overlap between the heat shrinkable tube with adhesive 5 and the fixing heat shrinkable tube 6) is held to prevent heat effect in molding the separated part housing 21 (see e.g., FIG. 9B).

As providing the separated part housing 21, the separated part housing 21 prevents the heat shrinkable tube with adhesive 5 from moving along the cable longitudinal direction (moving for the extended side of the power line 31 and the signal line 32). Thus, decreasing the above length L2 and slipped out of the sheath 33 are prevented. However, the separated part housing 21 fails to prevent the heat shrinkable tube with adhesive 5 from moving along the cable longitudinal direction since the separated part housing 21 softens in high temperature environment higher than softening temperature of the separated part housing 21 (e.g., the environment not less than 120° C. at which soft polyurethane softens). That is, only providing the separated part housing 21 fails to prevent developing the position gap of the heat shrinkable tube with adhesive 5 (decreasing the length L2, or slipped out of the sheath 33) in high temperature. Thus, the fixing heat shrinkable tube 6 is necessary.

The separated part housing 21 is provided with a main body 21a covering the separated part 3a and a part of the heat shrinkable tube with adhesive 5, and protruded electric wire protectors 21b, 21c that cover each extended part of the insulated wires (the power line 31 and the signal line 32) extended from the main body 21a respectively, or covers the circumference of the extended part of the plurality of insulated wires collectively. In the embodiment, a first electric wire protector 21b is provided to cover the circumference of the one pair of power lines 31 collectively, and a second electric wire protector 21c is provided to cover the circumference of the one pair of signal lines 32 collectively.

The electric wire protectors 21b, 21c swing following swing of the power line 31 or the signal line 32 when the power line 31 or the signal line 32 swings, and have function to prevent damaging the power line 31 or the signal line 32. Also, the electric wire protectors 21b, 21c have a function to hold the end of convoluted tube 22 that covers the power line 31 or the signal line 32. The convoluted tube 22 is a bellowed resin tube. The convoluted tube 22 prevents damaging the power line 31 or the signal line 32 caused by chipping. The convoluted tube 22 is provided to cover the entire one pair of power lines 31 from the separated part housing 21 to the first power connector, and the entire one pair of signal lines 32 from the separated part housing 21 to the wheel speed sensor 131 respectively.

The fix member 23 to fix the separated part housing 21 at any part of the vehicle 1 is attached on the main body 21a of the separated part housing 21. In the embodiment, the fix member 23 is provided with a hand 233 to fasten and fix the main body 21a, and a base part 23b to fix the main body 21a at any part of the vehicle 1 collectively. Meanwhile, a shape of the fix member 23 etc., is not limited to the shape shown in figures. It can be suitably changed depending on a shape of member that is an attachment target. Furthermore, the separated part housing 21 may also have function as the fix member 23 by providing clip etc., collectively. The fix member 23 is fixed on a non-rotational member such as a knuckle, which fails to rotate with the rotation of rear wheel 12, and ups and downs to the vehicle body 10 with the rear wheel 12 with respect to expansion and contraction of a suspension spring.

(Method of Manufacturing the Wire Harness)

Figure 5:
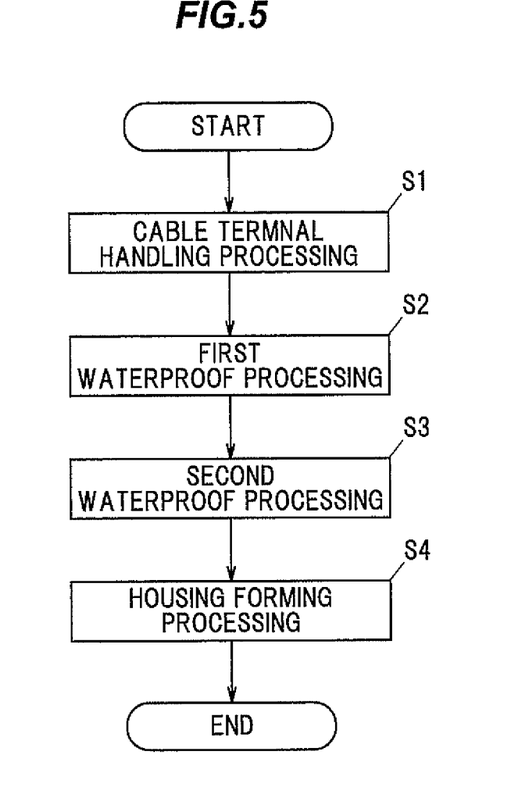
FIG. 5 is a flowchart showing a process of method of manufacturing the wire harness according to the embodiment of the invention.

FIG. 5 is a flowchart showing a process of method of manufacturing the wire harness according to the embodiment As shown in FIG. 5, the method of manufacturing the wire harness according to the embodiment is provided with a cable terminal handling processing S1 to conduct a terminal handling in the cable 3, a first waterproof processing S2 to attach the heat shrinkable tube with adhesive 5, a second waterproof processing S3 to attach the fixing heat shrinkable tube 6, a housing forming processing S4 to form the separated part housing 21.

Figure 6:
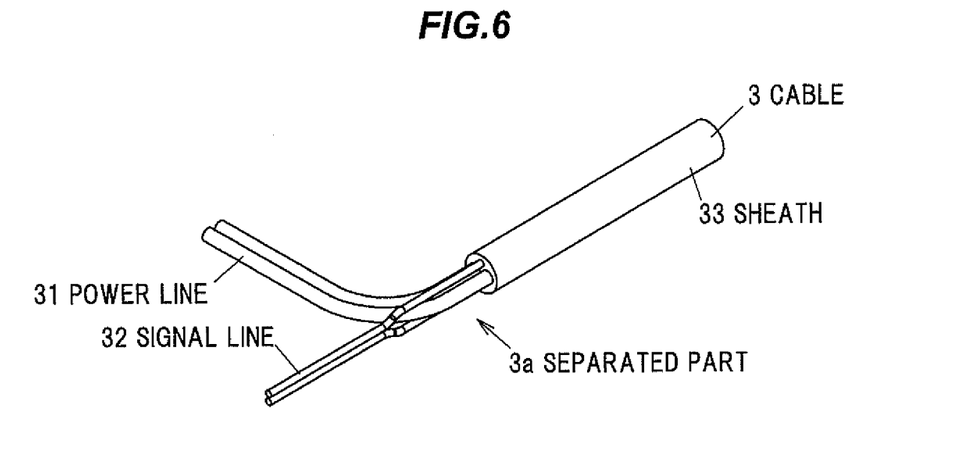
FIG. 6 is a perspective view showing a cable after terminal treatment.

As shown in FIG. 6, a predetermined long sheath 33 is cut from the cable 3, and the one pair of power lines 31 and the one pair of signal lines 32 are exposed at the cable terminal handling processing SI. In FIG. 6, to be with respect to FIGS. 3A, 4A, 4B, and 4B, although the one pair of power lines 31 and the one pair of signal lines 32 are shown while separated, it may not be necessary to separate the one pair of power lines 31 and the one pair of signal lines 32 in the cable terminal handling processing S1. The first waterproof processing S2 is conducted after conducting the cable terminal handling processing S1.

At the first waterproof processing S2, as shown M FIGS. 7A, 7B, a circular adhesive 52 is individually provided around the power line 31 and the signal line 32. The adhesive 52 melts when the heat shrinkable tube with adhesive 5 shrinks, and enters into the gap between the power line 31, the signal line 32, and the resin tube 51. The adhesive 52 has a function to fill and seal the gap. Although the case that the cable 3 having four cores is used is shown in the embodiment, when a number of core wires in the cable 3 is not less than three, the adhesive 52 is desirably used separately since the gap between the core wires becomes large and the gap may not be filled by only the adhesive layer of the heat shrinkable tube with adhesive 5.

The circular adhesive 52 is inserted from the terminal of the power line 31 or the terminal of the signal line 32. The circular adhesive 52 is provided while abutting on the sheath 33. Although the adhesive 52 is individually provided on each insulated wire (the power line 31, the signal line 32) in the embodiment, the adhesive 52 may be provided to cover a plurality of (e.g., each of two) insulated wires collectively. Moreover, the adhesive 52 is not limited to have a circular shape, for example, a columnar adhesive 52 may be provided on a space between the insulated wires.

Figure 8A:
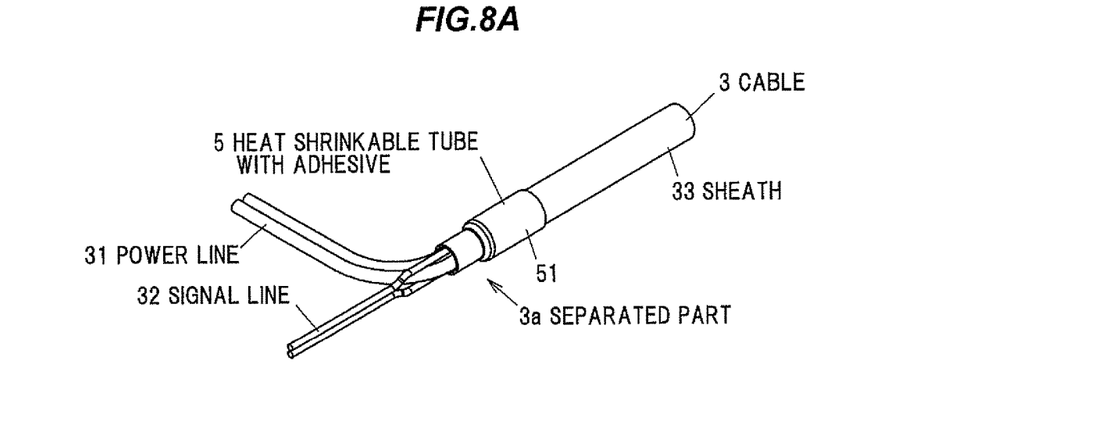
FIG. 8A is a perspective view showing the cable after a heat shrinkable tube with adhesive is provided.

At the first waterproof processing S2, as shown in FIG. 8A, the heat shrinkable tube with adhesive 5 is provided to cover the circumference of the sheath 33, the one pair of power lines 31 extended from the end of sheath 33 and the one pair of signal lines 32. The heat shrinkable tube with adhesive 5 is heated and shrunk.

In the embodiment, since the adhesive 52 is individually provided in the heat shrinkable tube with adhesive 5, the resin tube 51 of the heat shrinkable tube with adhesive 5 is shrunk too much when the adhesive 52 is heated in long time so as to sufficiently melt. Thus, the length L2 of the overlap between the heat shrinkable tube with adhesive 5 and the sheath 33 may be shortened.

Figure 8B:
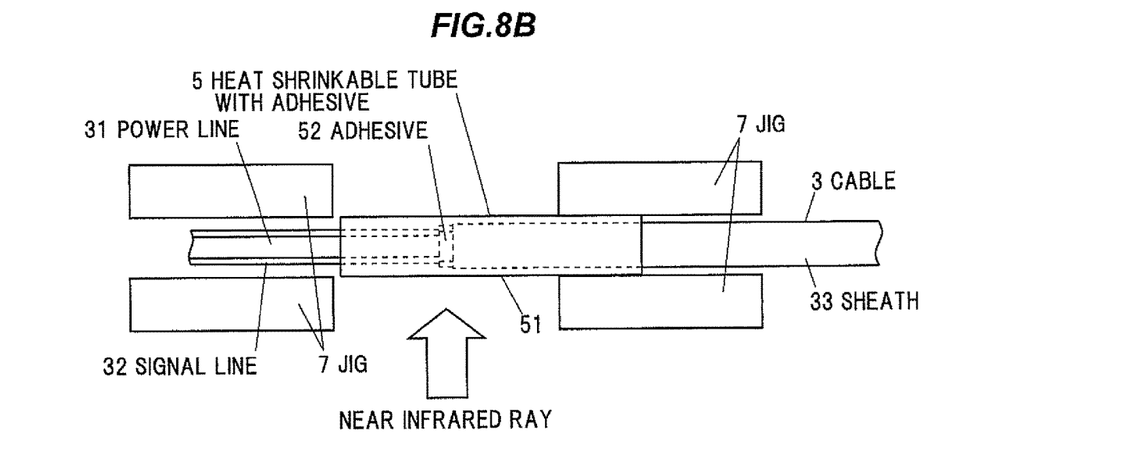
FIG. 8B is an explanation view showing a processing to shrink the heat shrinkable tube with adhesive.

As shown in FIG. 8B, at the first waterproof processing S2, the overlap between the heat shrinkable tube with adhesive 5 and the sheath 33, and the cable 3 are irradiated with the near infrared ray and heated while held by a jig 7. Therefore, developing the position gap of the heat shrinkable tube with adhesive 5 (moving the power line 31 and the signal line 32 for the extending side) is prevented if the adhesive 52 is heated in long time such that the adhesive 52 can melt sufficiently. Enough above length L2 is sufficiently ensured. And the waterproofness is ensured.

Meanwhile, the near infrared ray is blocked at a part of the heat shrinkable tube with adhesive 5 (the resin tube 51) held by the jig 7 (the end where the heat shrinkable tube with adhesive 5 overlaps the sheath 33) and the part of heat shrinkable tube with adhesive 5 held by the jig 7 is not directly irradiated with the near infrared ray caused by the jig 7. Thus, the part of heat shrinkable tube with adhesive 5 held by the jig 7 is not surely shrunk at the first time waterproof processing S2. When stopping irradiating the near infrared ray and heating, the adhesive 52 and the adhesive in the heat shrinkable tube with adhesive 5 are cured. Thus, the gap between the resin tube 51, the power line 31, the signal line 32, and the sheath 33 are sealed. The second waterproof processing S3 is conducted after conducting the first waterproof processing S2.

Figure 9A:
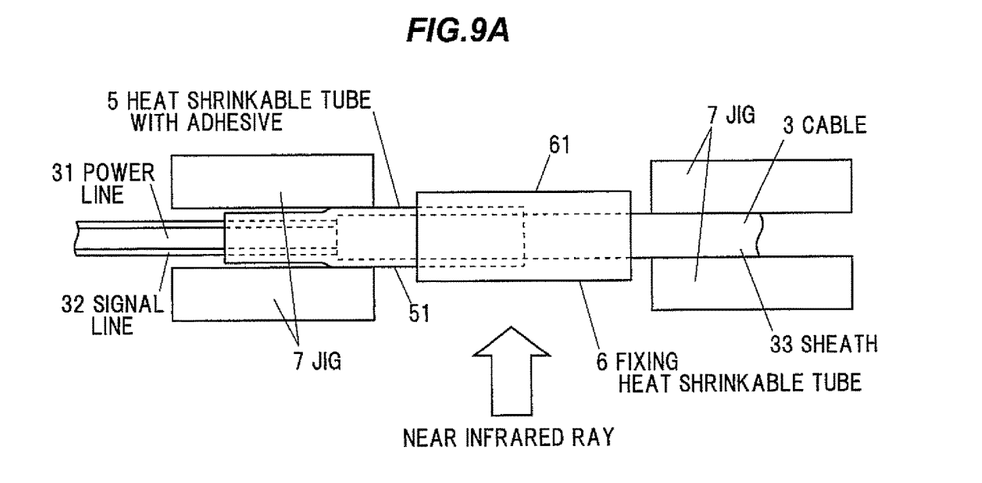
FIG. 9A is an explanation view showing a processing to shrink a fixing heat shrinkable tube.

At the second waterproof processing S3, as shown in FIG. 9A, the fixing heat shrinkable tube 6 is provided to cover the part of heat shrinkable tube with adhesive 5 where the sheath 3 covers and the circumference of the sheath 33 extended from the heat shrinkable tube with adhesive 5. And then, the fixing heat shrinkable tube 6 is irradiated with the near infrared ray. The fixing heat shrinkable tube 6 is heated, and shrunk At the second waterproof processing S3, the part of heat shrinkable tube with adhesive 5 (the resin tube 51) held by the jig 7 at the first waterproof processing S3 is also shrunk.

In the embodiment, since the shrinkage start temperature of the fixing heat shrinkable tube 6 is higher than the shrinkage start temperature of the heat shrinkable tube with adhesive 5, the heat shrinkable tube with adhesive 5 (the resin tube 51) provided inside is shrunk firstly, and then the fixing heat shrinkable tube 6 is shrunk at the second waterproof processing S3. It is unlikely to push out the heat shrinkable tube with adhesive 5 or generate wrinkle to the resin tube 51 by shrinking the fixing heat shrinkable tube 6. Therefore, the waterproofness is more surely ensured. After finishing the second waterproof processing S3, as shown in the states in FIGS. 3A, 3B, the cable waterproof structure 4 can be obtained. The housing forming processing S4 is conducted after conducting the second waterproof processing S3.

In the embodiment, although the first waterproof processing S2 to shrink the heat shrinkable tube with adhesive 5 and the second waterproof processing S3 to shrink the fixing heat shrinkable tube 6 (shrinking one end where the heat shrinkable tube with adhesive 5 overlaps with the sheath 33) are separated processes, the heat shrinkable tube with adhesive 5 and the fixing heat shrinkable tube 6 may be heated and shrunk in same time when it is not necessary to add other adhesive 52 such as using the cable having two cores. That is, the first waterproof processing S2 and the second waterproof processing S3 may be conducted in one processing. Meanwhile, if the first waterproof processing S2 and the second waterproof processing S3 are conducted in one step, it is not possible to check how long the length L2 of the overlap between the heat shrinkable tube with adhesive 5 and the sheath 33 becomes. Therefore, in terms of obtaining the length L2 surely and ensuring the waterproofness, it is more desirable to separate the first waterproof processing S2 with the second waterproof processing S3, and it is more desirable to attach the fixing heat shrinkable tube 6 after checking the length L2 becoming the prescribed length.

At the housing forming processing S4, the separated part housing 21 is formed by resin molding to cover the separated part 3a which separates the one pair of power lines 31 with the one pair of signal lines 32, and the part of the heat shrinkable tube with adhesive 5.

Figure 9B:
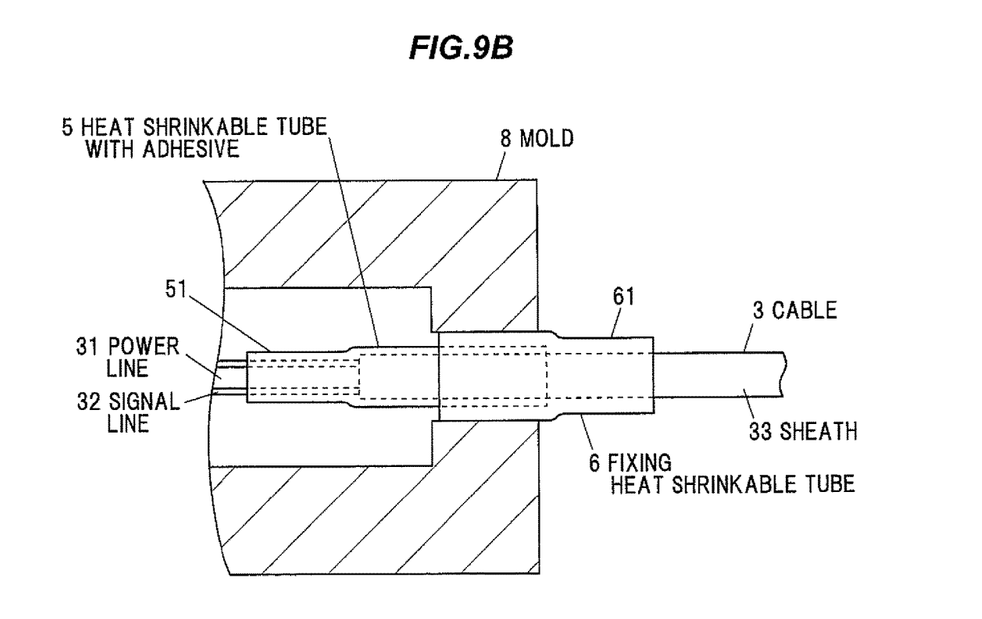
FIG. 9B is an explanation view showing the processing to form the separated part housing.

At the housing forming processing S4, as shown in FIG. 9B, resin is poured into the mold 8 and molding is conducted while the mold 8 holds the overlap between the heat shrinkable tube with adhesive 5 and the fixing heat shrinkable tube 6. In such configuration, heat effect in melted resin can be decreased by endothermic effect of the mold 8, and moving the heat shrinkable tube with adhesive 5 that is likely to shrink caused by the heat effect of the melted resin along the cable longitudinal direction :toying the power line 31 and the signal line 32 for extended side) is prevented by held by the mold 8. Developing the position gap of the heat shrinkable tube with adhesive 5 is prevented. Then, it becomes the state shown in FIG. 4A, after releasing the mold 8 and cooling. Also, it becomes the state shown in FIG. 4B if attaching the convoluted tube 22 and the fix member 23 as necessary. As described above, the wire harness 2 can be obtained.

(Effects of the Embodiment)

As described above, the cable water proof structure 4 according to the embodiment comprises a heat shrinkable tube with adhesive 5 that comprises adhesive inside, and is provided and shrunk to cover an end of the sheath 33 and a circumference of the plurality of insulated wires (the power liens 31 and the signal lines 32) extended from the end of the sheath 33; and a fixing heat shrinkable tube 6 that comprises no adhesive inside, and is provided and shrunk to cover a part of the heat shrinkable tube with adhesive 5 that covers the sheath 33 and a circumference of the sheath 33 extended from the heat shrinkable tube with adhesive 5, wherein a shrinkage start temperature of the fixing heat shrinkable tube 6 is higher than a shrinkage start temperature of the heat shrinkable tube with adhesive 5.

As such configuration, the heat shrinkable tube with adhesive 5 arranged inside the fixing heat shrinkable tube 6 can shrink before heating and shrinking the fixing heat shrinkable tube 6. Developing the position gap by pushing out the heat shrinkable tube with adhesive 5 by shrinking the fixing heat shrinkable tube 6 or wrinkling on the resin tube 51 is prevented. Thus, the waterproofness can be more surely ensured.

As the inventors actually manufacture and examine the wire harness 2, it is confirmed that the heat shrinkable tube with adhesive 5 fails to slip out of the sheath 33 and the waterproofness can be kept after the wire harness 3 is held at 140° C. in 1 hour.

(Summary of the Embodiment)

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A cable waterproof structure (4) comprising a plurality of insulated wires (31, 32) and a sheath (33) covering the plurality of insulated wires (31, 32) collectively, comprising:

a heat shrinkable tube with adhesive (5) that Comprises adhesive inside, and is provided and shrunk so as to cover an end of the sheath (33) and a circumference of the plurality of insulated wires (31, 32) extended from the end of the sheath (33); and a fixing heat shrinkable tube (6) that comprises no adhesive inside, and is provided and shrunk so as to cover a part of the heat shrinkable tube with adhesive (5) that covers the sheath (33) and a circumference of the sheath (33) extended from the heat shrinkable tube with adhesive (5), wherein a shrinkage start temperature of the fixing heat shrinkable tube (6) is higher than a shrinkage start temperature of the heat shrinkable tube with adhesive (5).

[2] The cable waterproof structure (4) according to [1], wherein the fixing heat shrinkable tube (6) comprises a material harder than the sheath (33).

[3] The cable waterproof structure (4) according to [1] or [2], wherein a length along a cable longitudinal direction of a non-overlap part between the fixing heat shrinkable tube (6) and the heat shrinkable tube with adhesive (5) is not less than 1 mm and not more than 12 mm, and wherein an overlap length along the cable longitudinal direction between the heat shrinkable tube with adhesive (5) and the fixing heat shrinkable tube (6) is not less than 1 mm and not more than 12 mm,

[4] A wire harness (2) comprising a cable (3) comprising a plurality of insulated wires (31, 32) and a sheath (33) covering the plurality of insulated wires (31, 32) collectively, comprising:

a heat shrinkable tube with adhesive (5) that comprises adhesive inside, and is provided and shrunk so as to cover an end of the sheath (33) and a circumference of the plurality of insulated wires (31, 32) extended from the end of the sheath (33); and a fixing heat shrinkable tube (6) that comprises no adhesive inside, and is provided and shrunk so as to cover a part of the heat shrinkable tube with adhesive (5) that covers the sheath (33) and a circumference of the sheath (33) extended from the heat shrinkable tube with adhesive (5), wherein a shrinkage start temperature of the fixing heat shrinkable tube (6) is higher than a shrinkage start temperature of the heat shrinkable tube with adhesive (5).

[5] The wire harness (2) according to [4], wherein the fixing heat shrinkable tube (6) comprises a material harder than the sheath (33).

[6] The wire harness (2) according to [4] or [5], wherein a length along the cable longitudinal direction of a non-overlap part between the fixing heat shrinkable tube (6) and the heat shrinkable tube with adhesive (5) is not less than 1 mm and not more than 12 mm, and wherein an overlap length along the cable longitudinal direction between the heat shrinkable tube with adhesive (5) and the fixing heat shrinkable tube (6) is not less than 1 mm and not more than 12 mm.

[7] The wire harness (2) according to any one of [4] to [6], wherein the plurality of insulated wires (31, 32) is separated at a heat shrinkable tube with adhesive (5) side opposite to the fixing heat shrinkable tube (6), and wherein the wire harness (2) comprises a separated part housing (21) covering a separated part (3A) that separates the plurality of insulated wires (31, 32), and a part of the heat shrinkable tube with adhesive (5).

[8] The wire harness (2) according to [7], wherein the separated part housing (21) comprises a resin mold, and wherein the separated part housing (21) fails to cover the fixing heat shrinkable tube (6).

[9] The wire harness (2) according to [7] or [8], wherein the separated part housing (21) collectively comprises a main body (21a) covering the separated part (3A) and a part of the heat shrinkable tube with adhesive (5), a protruded wire protector (21b, 21c) that covers each extended part of the insulated wires (31, 32) extended from the main body (21a) respectively, or covers a circumference of the extended part of the plurality of insulated wires (31, 32) collectively.

[10] A method of manufacturing a wire harness comprising a cable comprising a plurality of insulated wires (31, 32) and a sheath (33) covering the plurality of insulated wires (31, 32) collectively, comprising:

a first waterproof processing (S2) that provides a heat shrinkable tube with adhesive (5) that comprises adhesive inside to cover an end of the sheath (33) and a circumference of the plurality of insulated wires (31, 32) extended from the end of the sheath (33), and heats and shrinks the heat shrinkable tube with adhesive (6); and a second waterproof processing (S3) that provides a fixing heat shrinkable tube (6) that comprises no adhesive inside, of which shrinkage start temperature is higher than a heat shrinkage start temperature of the heat shrinkable tube with adhesive (5) to cover a part of the heat shrinkable tube with adhesive (5) that covers the sheath (33) and the sheath (33) extended from the heat shrinkable tube with adhesive (5), and heats and shrinks the fixing heat shrinkable tube (6).

[11] The manufacturing method according to [10], wherein the first waterproof processing (82) provides the heat shrinkable tube with adhesive (5) after providing an adhesive (52) on the circumference of the plurality of insulated wires (31, 32), and shrinks the heat shrinkable tube with adhesive (5) by heating and melts the adhesive (52).

[12] The manufacturing method according to [11], wherein the first waterproof processing (S2) heats an overlap between the heat shrinkable tube with adhesive (5) and the sheath (33), and the cable (3) while the overlap between the heat shrinkable tube with adhesive (5) and the sheath (33), and the cable (3) are held by a jig (7).

[13] The manufacturing method according to any one of [10] to [12], comprising a housing forming processing (S4) that forms a separated part housing (21) by molding resin to cover a separated part (3A) that separates the plurality of insulated wires (31, 32) and the part of the heat shrinkable tube with adhesive (5), wherein the housing forming processing (S4) molds the resin while an overlap between the heat shrinkable tube with adhesive (5) and the fixing heat shrinkable tube (6) are held by a mold (8).

Although the embodiment of the invention has been described, the invention according to claims is not to be limited to the above-mentioned embodiment. Further, please note that all combinations of the features described in the embodiment are not necessary to solve the problem of the invention.

The invention can be appropriately modified and implemented without departing from the gist thereof For example, in the embodiment, although using the four-core cable 3 comprising the one pair of power lines 31 and the one pair of signal lines 32 has been described, a number of the insulated wires is not limited thereto. The number of the insulated wires may be two, three, or not less than five. Moreover, all insulated wires of the cable 3 may be the power lines 31 or all insulated wires of the cable 3 may be the signal line 32.

Furthermore, a purpose of the signal line 32 is not limited to the wheel speed sensor 131. For example, the signal line 32 may be used for an air pressure sensor detecting air pressure in the wheels 11, 12 etc. The signal lines 32 having multi system for uses may be provided on the cable 3. Meanwhile, a purpose of the power line 31 is not limited to use to supply power to the EPB device 31. For example, it may be used to supply power to the EMB device.

Furthermore, in the above embodiment, although the separated part housing 21 comprising resin mold has been described, the separated part housing 21 may be configured by attaching a separately molded part (e.g., a part configured by dividing into two parts) to the separated part 3a.

What is claimed is:

1. A cable waterproof structure, comprising:
   a cable comprising a plurality of insulated wires and a sheath covering the plurality of insulated wires collectively;
   a heat shrinkable tube with adhesive that comprises adhesive inside, and is provided and shrunk so as to cover an end of the sheath and a circumference of the plurality of insulated wires extended from the end of the sheath; and
   a fixing heat shrinkable tube that comprises no adhesive inside, and is provided and shrunk so as to cover a part of the heat shrinkable tube with adhesive that covers the sheath and a circumference of the sheath extended from the heat shrinkable tube with adhesive,
   wherein a shrinkage start temperature of the fixing heat shrinkable tube is higher than a shrinkage start temperature of the heat shrinkable tube with adhesive.

2. The cable waterproof structure according to claim 1, wherein the fixing heat shrinkable tube comprises a material harder than the sheath.

3. The cable waterproof structure according to claim 1, wherein a length along a cable longitudinal direction of a non-overlap part between the fixing heat shrinkable tube and the heat shrinkable tube with adhesive is not less than 1 mm and not more than 12 mm, and wherein an overlap length along the cable longitudinal direction between the heat shrinkable tube with adhesive and the fixing heat shrinkable tube is not less than 1 mm and not more than 12 mm.

4. A wire harness, comprising:

a cable comprising a plurality of insulated wires and a sheath covering the plurality of insulated wires collectively;

a heat shrinkable tube with adhesive that comprises adhesive inside, and is provided and shrunk so as to cover an end of the sheath and a circumference of the plurality of insulated wires extended from the end of the sheath; and a fixing heat shrinkable tube that comprises no adhesive inside, and is provided and shrunk so as to cover a part of the heat shrinkable tube with adhesive that covers the sheath and a circumference of the sheath extended from the heat shrinkable tube with adhesive, wherein a shrinkage start temperature of the fixing heat shrinkable tube is higher than a shrinkage start temperature of the heat shrinkable tube with adhesive.

5. The wire harness according to claim 4, wherein the fixing heat shrinkable tube comprises a material harder than the sheath.

6. The wire harness according to claim 4, wherein a length along the cable longitudinal direction of a non-overlap part between the fixing heat shrinkable tube and the heat shrinkable tube with adhesive is not less than 1 mm and not more than 12 mm, and wherein an overlap length along the cable longitudinal direction between the heat shrinkable tube with adhesive and the fixing heat shrinkable tube is not less than 1 mm and not more than 12 mm.

7. The wire harness according to claim 4, wherein the plurality of insulated wires is separated at a heat shrinkable tube with adhesive side opposite to the fixing heat shrinkable tube, and wherein the wire harness comprises a separated part housing covering a separated part that separates the plurality of insulated wires, and a part of the heat shrinkable tube with adhesive.

8. A wire harness, comprising:

a cable comprising a plurality of insulated wires and a sheath covering the plurality of insulated wires collectively;

a heat shrinkable tube with adhesive that comprises adhesive inside, and is provided and shrunk so as to cover an end of the sheath and a circumference of the plurality of insulated wires extended from the end of the sheath; and a fixing heat shrinkable tube that comprises no adhesive inside, and is provided and shrunk so as to cover a part of the heat shrinkable tube with adhesive that covers the sheath and a circumference of the sheath extended from the heat shrinkable tube with adhesive, wherein a shrinkage start temperature of the fixing heat shrinkable tube is higher than a shrinkage start temperature of the heat shrinkable tube with adhesive, wherein the plurality of insulated wires is separated at a heat shrinkable tube with adhesive side opposite to the fixing heat shrinkable tube, wherein the wire harness comprises a separated part housing covering a separated part that separates the plurality of insulated wires, and a part of the heat shrinkable tube with adhesive, wherein the separated part housing comprises a resin mold, and wherein the separated part housing fails to cover the fixing heat shrinkable tube.

9. A wire harness, comprising:

a cable comprising a plurality of insulated wires and a sheath covering the plurality of insulated wires collectively;

a heat shrinkable tube with adhesive that comprises adhesive inside, and is provided and shrunk so as to cover an end of the sheath and a circumference of the plurality of insulated wires extended from the end of the sheath; and a fixing heat shrinkable tube that comprises no adhesive inside, and is provided and shrunk so as to cover a part of the heat shrinkable tube with adhesive that covers the sheath and a circumference of the sheath extended from the heat shrinkable tube with adhesive, wherein a shrinkage start temperature of the fixing heat shrinkable tube is higher than a shrinkage start temperature of the heat shrinkable tube with adhesive, wherein the plurality of insulated wires is separated at a heat shrinkable tube with adhesive side opposite to the fixing heat shrinkable tube, wherein the wire harness comprises a separated part housing covering a separated part that separates the plurality of insulated wires, and a part of the heat shrinkable tube with adhesive, and wherein the separated part housing collectively comprises a main body covering the separated part and a part of the heat shrinkable tube with adhesive, a protruded wire protector that covers each extended part of the insulated wires extended from the main body respectively, or covers a circumference of the extended part of the plurality of insulated wires collectively.

* * * * *